United States Patent [19]

Miller

[11] 4,246,980

[45] Jan. 27, 1981

[54] EVACUATION SLIDE DECELERATION

[75] Inventor: Ralph A. Miller, Monmouth Beach, N.J.

[73] Assignee: The Garrett Corporation, Los Angeles, Calif.

[21] Appl. No.: 67,651

[22] Filed: Aug. 17, 1979

[51] Int. Cl.³ .................. A62B 1/20; B65G 11/10
[52] U.S. Cl. .................. 182/48; 193/25 B; 244/137 P
[58] Field of Search ........... 182/48, 49; 193/25 B; 244/137 P

[56] References Cited

U.S. PATENT DOCUMENTS

| | | | |
|---|---|---|---|
| 2,936,056 | 5/1960 | Heyniger | 193/25 |
| 3,070,203 | 12/1962 | Hailstone | 193/25 |
| 3,092,232 | 6/1963 | Adams | 193/25 |
| 3,473,641 | 10/1969 | Fisher | 193/25 |
| 3,656,579 | 4/1972 | Fisher | 182/48 |
| 3,679,025 | 7/1972 | Rummel | 182/48 |
| 3,811,534 | 5/1974 | Fisher | 182/48 |
| 4,018,321 | 4/1977 | Fisher | 193/28 |

Primary Examiner—Reinaldo P. Machado
Attorney, Agent, or Firm—Albert J. Miller

[57] ABSTRACT

Evacuee deceleration means are provided at the lower end of an inflatable evacuation slide.

17 Claims, 8 Drawing Figures

EVACUATION SLIDE DECELERATION

BACKGROUND OF THE INVENTION

Inflatable evacuation slides and/or slide rafts have been installed on substantially all passenger-carrying aircraft to provide a rapid means for evacuating passengers in the event of an emergency. These inflatable devices are normally folded in an uninflated condition into a container or pack requiring a minimum of space in the interior of the aircraft and are either mounted on the interior of the aircraft door or immediately adjacent thereto. With the door closed a girt bar is connected to brackets on the floor inside the doorway such that in the event of an emergency it is only necessary to open the door to automatically deploy the slide. With the opening of the door, the girt bar will pull the slide from the door thereby allowing the slide to fall through the doorway. Subsequently the slide is rapidly inflated and is ready for evacuation of passengers within a very short period of time following opening of the door.

The descent of evacuees on an inflatable evacuation slide is primarily governed by the angle formed between the slide surface and the ground. The optimum rate is usually achieved when the angle therebetween is from about 30° as a minimum to about 50° as a maximum. The lower the angle, the slower the rate of descent and the evacuation may not proceed with sufficient dispatch. If the angle is much greater than 50°, the slide surface may be too precipitious and the evacuees will be reluctant to utilize the slide and even if they are persuaded to do so, may be injured upon impact with the ground.

Controlling the proper angle between the slide and the ground is made more complex since these evacuation slides are normally utilized only in an emergency situation. In such situations it may be that one or more of the landing gear of the aircraft have been damaged or collapsed such that the aircraft itself may be canted at a number of different possible angles. The result being that the aircraft door may be considerably higher or lower with respect to the ground than it would be in the normal situation. With the height of the door above the ground changed, the angle of the slide can be changed considerably also. Much the same situation can occur if the evacuation slide is utilized on terrain which varies in slope. This can also significantly affect the angle of the evacuation slide.

There have been a number of ideas advanced as to proper control of the speed at which an evacuee moves down a slide, both under normal operating conditions and also adapted to accommodate the extremes of landing gear collapse and/or widely varying terrain. One of the first methods advocated to accommodate the variable height of the aircraft door above the ground was to design evacuation slides of variable length. Examples of this approach are shown in U.S. Pat. Nos. 2,936,056; 3,463,266; and 3,554,344. Another early attempt at solving this problem was to provide a hinge or break in the slide such that the upper portion of the slide was at a steeper angle than the lower portion of the slide. Examples of this teaching are found in British Pat. No. 1,206,936 and U.S. Pat. Nos. 3,070,203; 3,092,232; 3,463,266, and 3,470,991. An example of a curved evacuation slide designed to accomplish the same purpose is shown in U.S. Pat. No. 3,712,417.

It should be noted that U.S. Pat. No. 2,936,056 mentioned above as an example of a variable length evacuation slide also indicates that a better sliding characteristic material may be bonded to the upper surface of the evacuation slide to improve the sliding characteristics thereof. U.S. Pat. No. 3,679,025 advocates coating the top slide surface to reduce the friction thereof. Also note U.S. Pat. No. 3,473,641 wherein the upper sliding surface is stated to have a lower coefficient of sliding friction while the lower sliding surface should have a higher sliding coefficient of friction. One additional method of slowing the descent is to be found in U.S. Pat. Nos. 3,070,203 and 3,092,232 which provide for an increased sag in the sliding surface at the lower portion of the evacuation slide. This increase sag will result in a greater coefficient of friction for the evacuee at the lower portion of the slide.

SUMMARY OF THE INVENTION

The present invention is directed to means to decelerate evacuees sliding on an inflatable evacuation slide from an elevated egress of an aircraft to a lower surface upon which the aircraft is at rest. The lower portion of the evacuation slide is rippled to produce alternating ridges and grooves across the sliding surface. This rippling effect can be produced by affixing to the underside of the sliding surface a deceleration panel having alternating transverse ridges and grooves. Such a panel can be made by forming loops in a fabric panel around individual cord lengths and folding the loops over and affixing them to the panel. The panel thus made will produce the alternating grooves and ridges in the lower portion of an inflatable evacuation slide by bonding it to the underside of the sliding surface thereof. To provide the best results the loops should be folded in a direction towards the elevated egress to which the evacuation slide is attached. Deceleration can be enhanced by adding a high friction elastomer coating to the lower portion of the sliding surface in the area of the alternating transverse ridges and grooves.

DETAILED DESCRIPTION OF THE PREFERRED EMBODIMENTS

Figure 1:
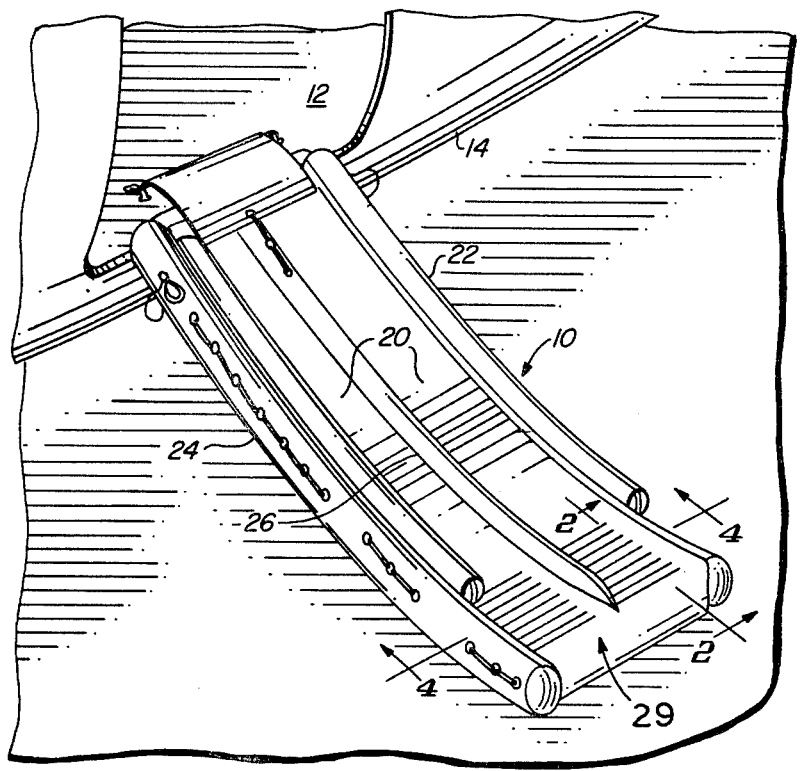
FIG. 1 is a schematic perspective view illustrating a portion of an aircraft fuselage including a doorway therein and an inflatable evacuation slide deployed therefrom with its lower end resting upon the ground.
Figure 3A:
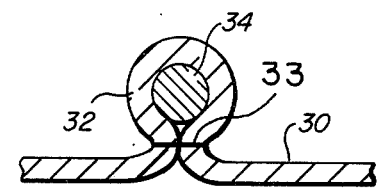
FIGS. 3A, 3B, 3C and 3D illustrate in cross-section the intermediate configurations in producing the deceleration panel shown in cross-section in FIG. 2.
Figure 3B:
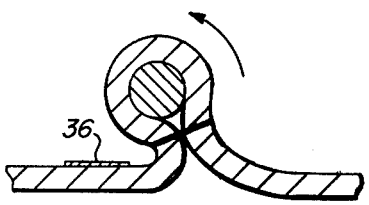
Figure 3C:
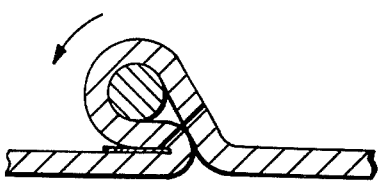

Illustrated in FIG. 1 is an inflatable evacuation slide 10 shown extending to the ground from a doorway 12 of an aircraft fuselage 14. The evacuation slide generally comprises an inflatable beam structure including a plurality of individual inflatable beams 22, 24 and 26 across which is stretched a generally taut, fabric sliding surface 20 upon which evacuees from the aircraft may slide.

The inflatable evacuation slide 10 as illustrated in FIG. 1 is shown for illustrative purposes only and may comprise any one of many different configurations all of which are well known in the art. The methods of attaching the evacuation slide at the aircraft doorway and of deploying and inflating the slide therefrom are also well known and need not be described herein.

Figure 2:
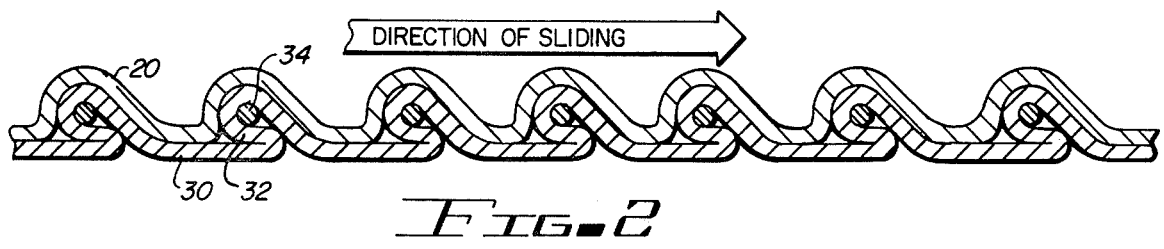
FIG. 2 is a cross-sectional view of the lower portion of the inflatable evacuation slide taken along line 2—2 of FIG. 1.

At the lower portion of the inflatable evacuation slide 10 is provided a deceleration panel 29 which generally comprises a plurality of transversly extending alternating grooves and ridges. These transversely extending, alternating grooves and ridges can be provided by affixing to the underside of the sliding surface 20 the deceleration panel as shown in FIG. 2.

Figure 4:
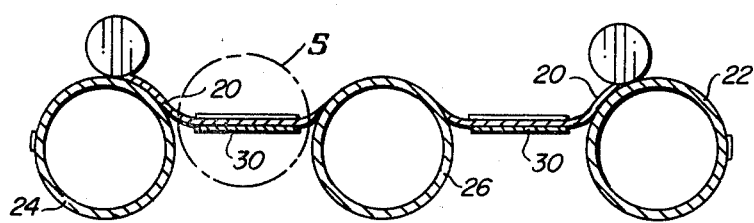
FIG. 4 is a cross-sectional view of the lower portion of the evacuation slide taken along line 4—4 of FIG. 1.
Figure 5:
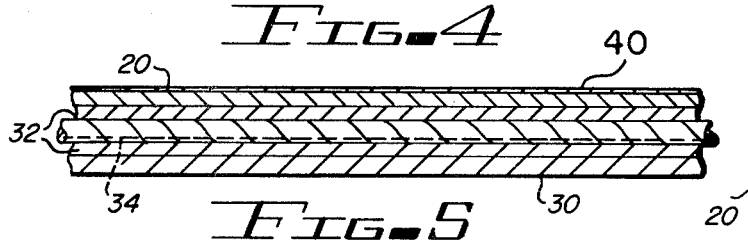
FIG. 5 is an enlarged sectional view of the circled area of FIG. 4.
Figure 3D:
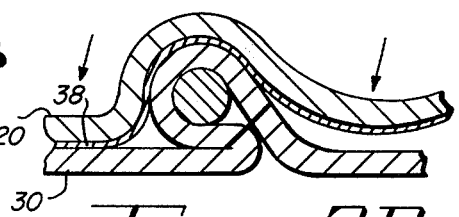

The steps of producing this panel are generally illustrated in FIGS. 3A, 3B, 3C and 3D. The panel 29 is formed of a panel fabric 30 of the same or compatible material as the sliding surface of the evacuation slide, with a number of individual parallel loops 32 formed around a cord 34. Suitable fabric materials include either woven fiber nylon or dacron, preferably coated with a suitable elastomer on both sides. The cord may be held within the loops by stitching 33. After the loops 32 are formed, they are folded all in the same direction and held against the panel fabric 30 by means of an adhesive 36. An adhesive sheet 38 may be used to secure the panel 29 to the underside of the sliding surface 20. FIGS. 4 and 5 illustrate in more detail the deceleration panel 29 and its relationship to the evacuation slide 10.

In order to produce the most effective retardation, the loops 32 should all be folded in the direction towards the elevated egress. This is illustrated in FIG. 2 with the loops shown as folded in a direction opposed to the direction of sliding. Also a high friction elastomer coating 40 may be applied to the upper surface of the sliding surface over the deceleration panel as shown in FIG. 5.

The above-described deceleration method and apparatus provides a rugged, positive means of deceleration and effectively retard the evacuee over a relatively short span at the lower end of the evacuation slide. The rippling or corrugated surface serves as an impediment to sliding since these ridges and grooves must be deflected and twisted by the evacuee as the evacuee passes over them. Thus they absorb some of the evacuee kinetic energy and the evacuee does have to be decelerated solely by direct frictional contact between the evacuee and the sliding surface.

The alternating ridges and grooves provide a high contact pressure sufficient to prevent hydroplanning under wet surface conditions. The grooves also serve to provide drainage patches or troughs to channel water away from the sliding surface. By bonding or affixing the deceleration panel to the underside of the sliding surface, no top seams or areas of load concentration are introduced and in fact the strength of the sliding surface in the area of the deceleration panel is actually increased.

While specific embodiments of the invention have been illustrated and described, it is to be understood that they are provided by way of example only and that the invention is not to be construed as being limited thereto but only by the proper scope of the appended claims.

What I claim is:

1. A method of decelerating evacuees sliding down an inflatable evacuation slide from an elevated egress of an aircraft to a lower surface upon which the aircraft is at rest, comprising the steps of:

providing a generally taut fabric sliding surface for evacuees; and rippling the lower portion of the sliding surface to produce alternating transverse ridges and grooves thereacross.

2. The method of claim 1 comprising the additional step of coating the lower portion of the sliding surface with a high friction elastomer.

3. The method of claim 1 wherein the lower portion of the sliding surface is rippled by affixing to the underside thereof a deceleration panel having alternating transverse ridges and grooves.

4. The method of claim 3 wherein the deceleration panel is produced by the steps of:
forming loops in the panel around a cord;
stitching the loops to hold the cord therein; and
folding the loops over and affixing the loops to the upper surface of the panel.

5. The method of claim 4 wherein the loops are folded in a direction towards the elevated egress.

6. The method of claim 4 wherein the folded over loops are affixed to the upper surface of the panel by adhesive.

7. The method of claim 3 wherein the deceleration panel is affixed to the underside of the lower portion of the sliding surface by adhesive.

8. A method of making a deceleration panel to be affixed to the underside of the lower portion of an inflatable evacuation slide to ripple the sliding side thereof, comprising the steps of:
forming a plurality of transverse loops in the panel, each individual loop being formed around a cord;
stitching the base of each transverse loop to maintain the cord therein;
folding over the individual stitched loops; and
affixing the folded over stitched loops to the panel adjacent thereto.

9. The method of claim 8 wherein all of the individual stitched loops are folded over in the same direction.

10. An inflatable slide for evacuation from an elevated egress of an aircraft to a lower surface upon which the aircraft is at rest, comprising:
a fluid distensible beam structure extending from the elevated egress to the lower surface; and
a floor fabric operably affixed to the fluid distensible beam structure to provide a generally taut sliding surface for evacuees from the elevated egress, the lower portion of floor fabric having alternating transverse ridges and grooves across the sliding surface to decelerate evacuees sliding thereon.

11. The inflatable evacuation slide of claim 10 wherein a deceleration panel having alternating transverse ridges and grooves is affixed to the underside of the lower portion of the floor fabric to produce the alternating transverse ridges and grooves across the sliding surface of the lower portion of the floor fabric.

12. The inflatable evacuation slide of claim 10 wherein the lower portion of the sliding surface is coated with a high friction elastomer.

13. The inflatable evacuation slide of claim 11 wherein the deceleration panel comprises:
a fabric panel;
a plurality of individual cords; and
a plurality of parallel fabric panel loops, individual loops formed around the individual cords, folded over toward the elevated egress end of said fabric panel and affixed thereto.

14. The inflatable evacuation slide of claim 11 wherein said deceleration panel is affixed to the underside of the floor fabric with a sheet adhesive.

15. A deceleration panel for affixing to the underside of the lower portion of the sliding surface of an evacuation slide from an elevated egress of an aircraft comprising:
   a fabric panel;
   a plurality of individual cords; and
   a plurality of parallel fabric panel loops, individual loops formed around individual cords, folded over toward the elevated egress end of said fabric panel and affixed thereto.

16. The inflatable evacuation slide of claims 13 or 15 wherein said parallel fabric loops are formed around said cords by stitching.

17. The inflatable evacuation slide of claims 13 or 15 wherein said folded over fabric loops are affixed to said fabric panel by adhesive.

* * * * *